United States Patent [19]

Meyer

[11] 4,065,862

[45] Jan. 3, 1978

[54] METHOD AND APPARATUS FOR SYNCHRONIZING DATA AND CLOCK SIGNALS

[75] Inventor: Russell L. Meyer, Phoenix, Ariz.

[73] Assignee: American Express Company, New York, N.Y.

[21] Appl. No.: 613,249

[22] Filed: Sept. 15, 1975

[51] Int. Cl.² ............................................. G06F 13/02
[52] U.S. Cl. ................................................... 364/200
[58] Field of Search .................... 340/172.5; 178/69.5; 364/200

[56] References Cited

U.S. PATENT DOCUMENTS

| | | | |
|---|---|---|---|
| 3,061,192 | 10/1962 | Terzian | 235/157 |
| 3,302,185 | 1/1967 | Cox, Jr. et al. | 340/172.5 |
| 3,328,772 | 6/1967 | Oeters | 340/172.5 |
| 3,809,820 | 5/1974 | Sullivan | 179/15 BA |
| 3,906,484 | 9/1975 | Melvin, Jr. et al. | 340/347 DD |

Primary Examiner—Gareth D. Shaw
Assistant Examiner—C. T. Bartz
Attorney, Agent, or Firm—Richard E. Alexander, Ltd.

[57] ABSTRACT

Method and apparatus for synchronizing data signals with clock pulses in a data transmission computer system having a computer for generating data signals and a local data set for transmitting the data signals to a remotely located data set, includes a receiving register for storing the data signals and a transmitting register coupled to the output of the receiving register for receiving and storing data signals from the receiving register. Logic circuits respond to clock signals from the local data set to cause the data signals to be transferred from the receiving register to the transmitting register and from there to the local data set. The clock pulses from the local data set are synchronized with the data signals as they are stored in the receiving register, the data signals being transferred from the transmitting register to the local data set under the control of the logic circuits in synchronism with the clock signals from the local data set.

20 Claims, 6 Drawing Figures

METHOD AND APPARATUS FOR SYNCHRONIZING DATA AND CLOCK SIGNALS

The present invention relates to a method and apparatus for synchronizing data and clock signals, and it more particularly relates to a method and apparatus for synchronizing data signals from a computer in a data transmission system with clock pulses from a local data set so that the data signals can be transferred synchronously to a remotely located data set.

Data transmission systems have been employed for transferring data from a computer to a local data set or modem eliminator and from there via a transmission line, such as a telephone line, to a remotely located data set. The data can then be utilized at the remote location in different manners, such as displaying the information on an IBM 2260 cathode ray tube display unit via an IBM 2848 control unit or other such line compatible type equipment. Thus, a single centrally located computer can transfer its data to many different remote locations in an efficient and convenient manner. In such a system, the local computer and line controller, for example, might be an IBM 360 computer with an IBM 2701 or an IBM 2702 controller, which are expensive and complex computer equipment for generating isochronous data. Isochronous data is data which is synchronously transmitted asynchronous data, and in this regard, asynchronous data is one having start and stop bits at the beginning and end of the serial data which is at the same time synchronized with clock pulses associated with the data sets. In such a system, the data sets or modem eliminators are synchronously controlled units, and the remotely located data utilizing equipment, such as the IBM 2848 control unit is asynchronous equipment using clocking information supplied by the remote data set or modem eliminator. Therefore, while such a system is satisfactory for some applications, it would be highly desirable to have a less complex computer for some applications and still be able to utilize the data at the remote location in the same manner. In this regard, it would be desirable to have a less sophisticated and less expensive computer such as the Honeywell 716 computer, which supplies asynchronous data, while utilizing the data at a remote location in an inexpensive and yet reliable manner.

Therefore, the principal object of the present invention is to provide a new and improved method and apparatus for synchronizing data signals with a train of clock pulses, such as those produced by a local data set or modem eliminator.

Briefly, the above and further objects of the present invention are realized by providing a method and apparatus for synchronizing data signals with clock pulses, by storing the data signals from a computer in a receiving register, and transferring the data signals from the receiving register to a transmitting register for storage therein. The data signals are transferred from the receiving register to the transmitting register and from the transmitting register to a local data set under the control of logic circuits in response to the clock signals. Other circuits respond to the clock signals for synchronizing the data signals with the clock pulses as the data signals are stored in the receiving register. The data signals are transferred from the transmitting register to the local data set under the control of the logic circuits in synchronism with the clock signals.

Other objects and advantages of this invention will become apparent from the following description when taken in connection with the accompanying drawings, wherein.

Figures 1, 4:
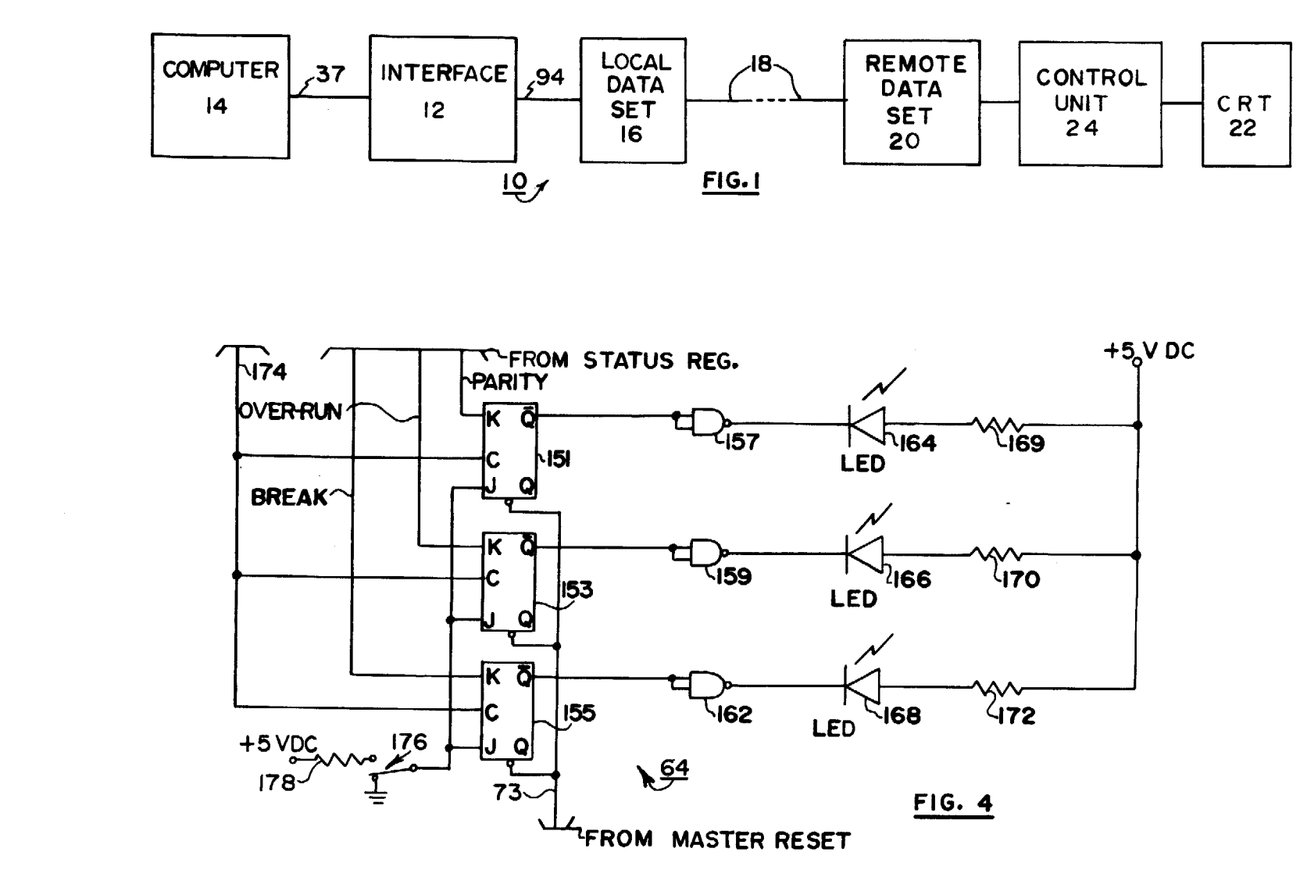
FIG. 1 is a block diagram of a data transmission computer system incorporating the principles of the present invention.
FIG. 4 is a schematic and symbolic block diagram of an error display unit of the interface circuit of FIG. 2.

Referring now to the drawings, and more particularly to FIG. 1 thereof, there is shown a data transmission computer system 10 including an interface circuit 12 which incorporates the principles of the present invention and which synchronizes data signals from a computer 14 with clock pulses from a local data set 16. The computer or data processor 14 may be a Honeywell 716 mini-computer or similar type of computer which generates asynchronous data. Asynchronous data is data transmitted in serial form with start and stop bits. The local data set 16 is a synchronous type data set using E.I.A. standards RS-232-C mode of operation. The synchronous mode of operation means that separate clock signals are transmitted with the data signals so that the data signals can be synchronized with the clock signals associated therewith. A transmission line, such as the telephone line 18, interconnects the local data set 16 with a remotely located data set 20 for receiving in a synchronous manner the asynchronous serial data generated by the computer 14 and transmitted from the local data set 16 via the interface circuit 12. In order to utilize the data received at the remotely located data set 20, a utilization device, such as a cathode ray tube display unit 22 responds to the data signals received via the data set 20 under the control of a control unit 24. The local data set 16 modulates the data information received from the computer 14 via the interface 12 to send the modulated information over the telephone line 18 to the terminal or remotely-located data set 20 which in turn demodulates the data information and converts it into binary information for the control unit 24. The control unit 24 operates asynchronously to prepare the information for the cathode ray tube display unit 22. The system 10 perferably employs a speed of transmission at the rate of 2400 bits per second, but as hereinafter described in greater detail, higher bit rates may also be accommodated by the system 10. The cathode ray tube display unit 22 may be an IBM 2260 and the control unit 24 may be an IBM 2848, the data sets employing a 201B compatible modem or a suitable modem eliminator. A request for an information display is transmitted via the data sets back to the computer 14 in asynchronous format via a connection (not shown) between the local data set 16 and the computer 14 independent of the interface circuit 12. Thus, in accordance with the present invention, a computer, such as the Honeywell 716 mini-computer, can communicate with a control unit 24 at a remote location by sending asynchronous serial information over the telephone line 18 between the synchronously operated data sets. Thus, a less expensive and less complex computer may be employed in the place of a more expensive computer, such as the IBM 2701 or the IBM 2702 which generate asynchronous serial data in a synchronous manner with the local data set. Such data information may be referred to as isochronous data—both synchronous and asynchronous at the same time. Such isochronous information would be required to be transmitted via the synchronous data sets to the control unit 24, such as the IBM 2848 unit which operates in an asynchronous mode of operation. The interface circuit 12 of the present invention thus serves as an isochronous line adapter to enable the asynchronous data signals from the computer 14 to be synchronized with the clock pulses of the local data set 16.

Figure 2:
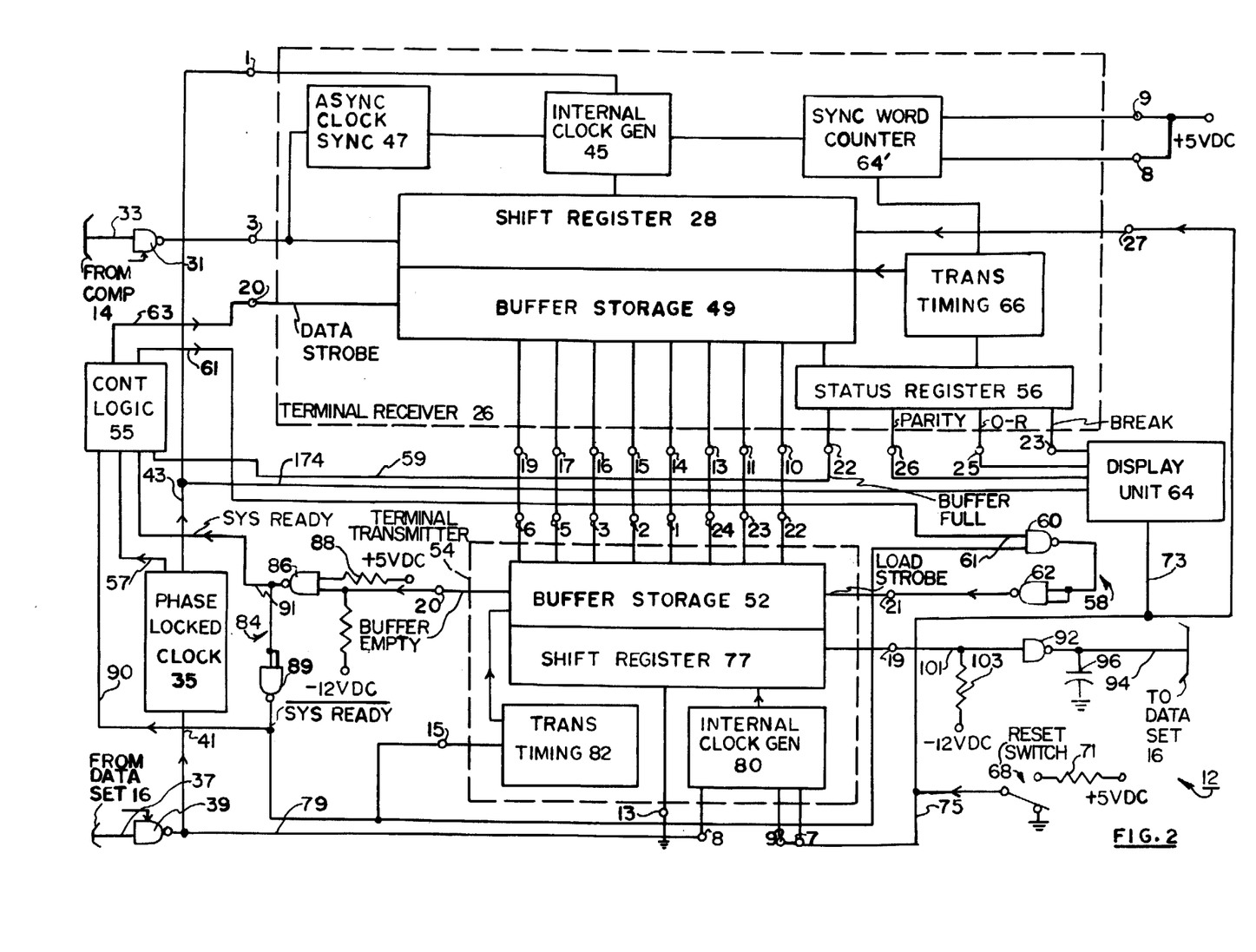
FIG. 2 is a schematic functional block diagram of an interface circuit used in the system of FIG. 1 and incorporating the principles of the present invention.

Considering now the interface circuit 12 with reference to FIG. 2 of the drawings, there is shown the interface circuit 12 which includes a terminal receiver integrated circuit 26 having a shift register 28 for receiving and storing the serial data in asynchronous form from the computer 14 via a receiver gate 31 which has its input connected to the output of the computer 14 via a lead 33 and has its output connected to the pin 3 of the terminal receiver integrated circuit 26. In order to synchronize the data pulses received from the computer 14 with the clock pulses from the local data set 16, a phase locked clock 35 is driven in phase with clock pulses received from the local data set 16 via a lead 37 through a receiver gate 39 via the phase locked clock 35 via a lead 41. The output of the clock 35 is supplied to the pin 1 of the terminal receiver 26 via a lead 43. An internal clock generator 45 of the terminal receiver 26 has its input connected to pin 1 for synchronizing the clock pulses with the data signals for controlling the shift register 28. An asynchronous clock synchronizer 47 of the terminal receiver 26 has its input responsive to the input data signals received from the gate 31 and has its output connected to an input of the internal clock generator 45, whereby the internal clock generator 45 and the asynchronous clock synchronizer serve to synchronize the incoming data signals from the computer 14 with the clock pulses of the local data set 16. As hereinafter described in greater detail, the phase locked clock 35 supplies 64 phase locked clock pulses for each data bit time. The internal clock generator 45 and the asynchronous clock synchronizer 47 cause a single cycle input signal to be gated out of the clock generator 45 at the center of a data bit. This signal from the internal clock generator 45 is the internal clock signal which samples the data and provides the internal timing for the terminal receiver 26. Only the pertinent portion of the terminal receiver 26 is shown and described herein to enable one skilled in the art to understand the principles of the present invention. The terminal receiver integrated circuit 26 may be purchased from Motorola Semiconductor Products, Inc., Box 20912, Phoenix, Ariz. 85036, under the designation terminal receiver MC2259L.

A buffer storage 49 of the terminal receiver 26 receives and stores temporarily the data received in serial form in the shift register 28, the data being transferred from the shift register 28 to the buffer storage 49 in a parallel manner. A similar buffer storage 52 of a terminal transmitter integrated circuit 54 receives and temporarily stores the data signals in a parallel manner from the buffer storage 49. In order to facilitate the transfer of information, as hereinafter described in greater detail, a control logic circuit 55 under the control of the phase locked clock 35 via a lead 57 enables the data to be transferred from the receiver 26 to the transmitter 54 in a controlled manner in response to, among other things as hereinafter described, a signal BUFFER FULL from a status register 56 of the terminal receiver 26. The status register 56 responds to the buffer storage 49 containing the data signals to generate the signal BUFFER FULL, which is supplied to the control logic 55 via a lead 59 to cause in turn the generation of the signal DATA STROBE to enable the data to be transferred to the buffer storage 52. A set of transfer logic gates 58 includes a NAND gate 60 which has one of its inputs responsive to an output lead 61 of the control logic 55 and has its output connected through an inverter gate 62 to pin 21 of the terminal transmitter 54 for generating a signal LOAD STROBE for the buffer storage 52. The signal LOAD STROBE is generated in response to the control logic 55 by the output of the gate 62 to enable the buffer storage 52 to receive the data from the buffer storage 49. An output lead 63 of the control logic 55 is connected to the pin 20 of the receiver terminal 26 to supply a DATA STROBE signal to the buffer storage 49, whereby once the buffer storage 49 is filled, it thereafter transfers its contents to the buffer storage 52 as hereinafter described in greater detail.

A synchronous word counter 64' of the terminal receiver 26 responds to the internal clock generator 45 and controls a transfer timing circuit 66 of the terminal receiver 26 for the purpose of controlling the number of characters being transferred from the shift register 28 to the buffer storage 49. In this regard, 8 bit characters are transferred at a time from the shift register 28 to the buffer storage 49.

A master reset switch 68 normally supplies ground potential to the shift register 28 via pin 27 of the terminal receiver 26, but for the purpose of resetting the shift register 28, the switch 68 can be activated to supply +5 volts DC through resistor 71 to the pin 27 of the receiver terminal 26. Similarly, a lead 73 connects the master reset switch 68 to the display unit 64 so that when the master reset switch 68 is actuated to supply the +5 volt potential, the display unit 64 is reset as hereinafter described in greater detail. A lead 75 in a similar manner connects the master reset switch 68 to pins 9 and 7 of the terminal transmitter 54 to reset a shift register 77 of the terminal transmitter 54.

Considering now the terminal transmitter integrated circuit 54 in greater detail, the pertinent portions of the terminal transmitter will now be described. The terminal transmitter integrated circuit 54 may be purchased from the same manufacturer as the one mentioned above in connection with the terminal receiver. Only the portions of the terminal transmitter integrated circuit 54 will now be described to enable one skilled in the art to understand the principles of the present invention. A lead 79 connects the output of the gate 39 to the pin 8 of the terminal transmitter 54 which in turn is connected to an internal clock generator 80 of the terminal transmitter so that the clock pulses from the local data set 16 are supplied to the terminal transmitter for controlling the transmitting of serial data from the shift register 77 to the local data set 16 in a synchronous manner. It should be understood that the data signals being transferred in a serial manner from the shift register 77 to the local data set 16 is in the form of asynchronous information. A transfer timing circuit 82 of the terminal transmitter 54 is connected to pin 15 which in turn is connected to a system timing logic circuit 84 for generating the signal $\overline{\text{SYSTEM READY}}$. The system timing logic circuit 84 includes a NAND gate 86 which has one of its inputs energized by a signal BUFFER EMPTY generated by the buffer storage 52 via pin 20 of the terminal transmitter 54. The other input to the gate 86 is connected through a biasing resistor 88 to a +5 volts DC. An inverter gate 89 generates the signal SYSTEM READY and has its input connected to the output of the gate 86.

In order to enable the control logic 55 to control the transfer of data between the terminal receiver 26 and the terminal transmitter 54, a lead 90 supplies the signal SYSTEM READY to the control logic 55. The signal SYSTEM READY comes true when the signal BUFFER EMPTY comes true, indicating that the data previously stored in the buffer storage 52 has been transferred into the shift register 77 and that the terminal transmitter 54 is ready to accept new data from the terminal receiver 26. As hereinafter described in greater detail, when a signal BUFFER FULL becomes true, indicating that the data has been transferred from the shift register 28 to the buffer storage 49 and is ready to be transferred to the terminal transmitter 54, the control logic 55 causes the generation of a signal DATA STROBE, which signal enables the execution of the data transfer operation under the control of the clock signals supplied on lead 57 to the control logic 55.

The output of the terminal transmitter 54 at pin 19 is connected over lead 101 to an input of a driver gate 92 and over resistor 103 to a −12 volts DC potential. The driver gate 92 has its output connected to a lead 94 for supplying the output data signals from the shift register 77 to the local data set 16. A capacitor 96 is connected from the lead 94 to ground. The receiver gate 31, the transmitter clock gate 39, and the driver gate 92 are adapted to the RS-232-C standards.

Figure 3:
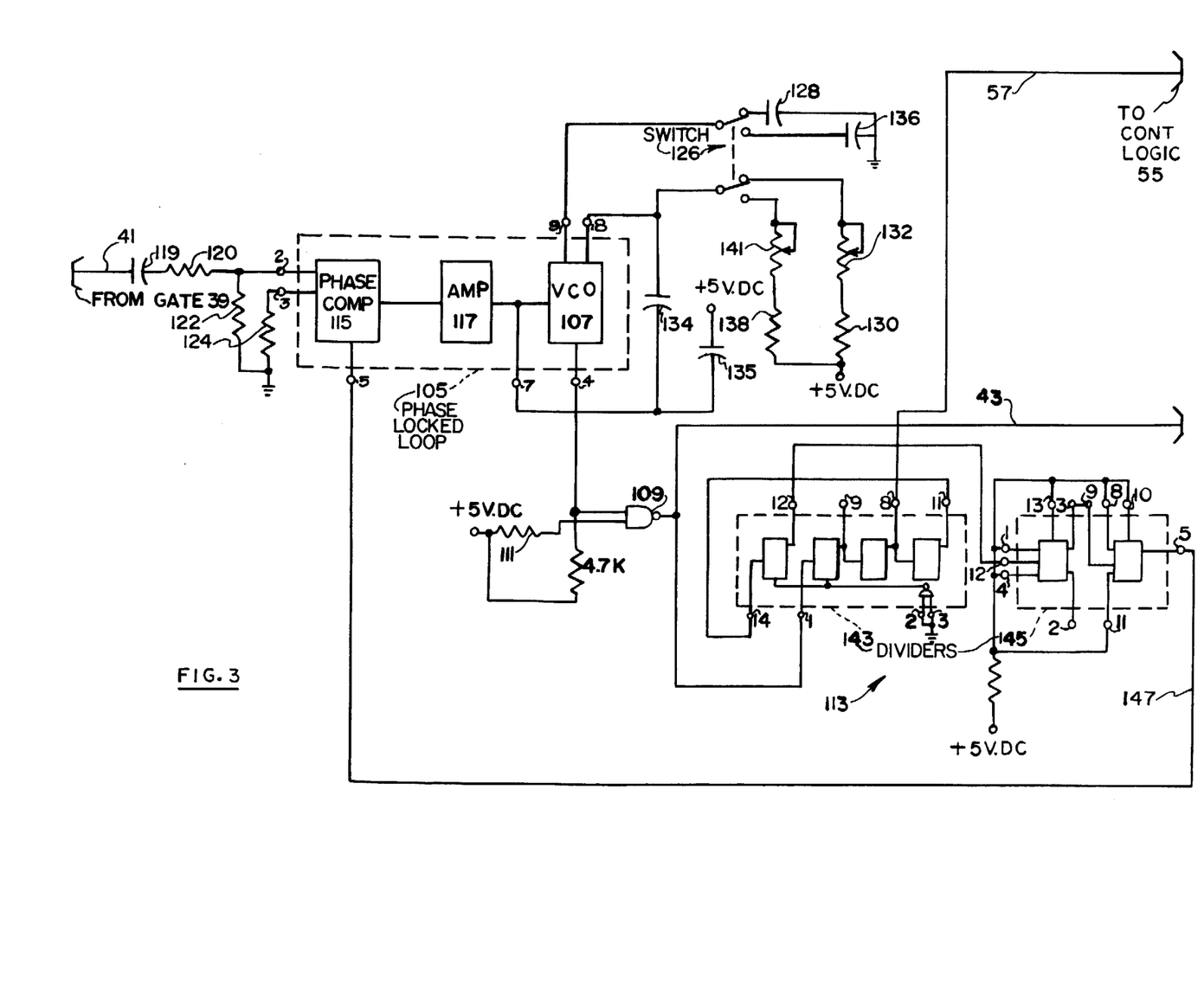
FIG. 3 is a schematic and symbolic block diagram of a phase locked clock circuit of the interface circuit of FIG. 2.

Considering now the phase locked clock 35, which is shown in FIG. 3 of the drawings, the phase locked clock 35 includes a phase locked loop circuit 105, such as the type SN565, commercially available from National Semiconductor, and a frequency divider circuit 113. The phase locked loop 105 includes a voltage controlled oscillator 107, a phase comparator 115 and an amplifier 117. The input of the phase comparator circuit 115 at pin 2 is connected to the data set 16 over series connected capacitor 119 and resistor 120 and lead 41. A pair of resistors 122 and 124 are connected between inputs of the phase comparator 115 at pins 2 and 3, respectively, and ground.

The output of the phase comparator 115 is connected through amplifier 117 to the voltage controlled oscillator 107 to control its output to keep it in step with the clock pulses of the local data set 16. Control clock pulses provided at pin 8 of the divider 143 are extended to the control logic 55 over lead 57.

The output of the voltage controlled oscillator 107 at pin 4 is fed back to an input of the phase comparator 115 over the frequency divider circuit 113. The frequency divider circuit 113, which is interposed between the output of the voltage controlled oscillator at pin 4 of the device 105 and the input of the phase comparator circuit 115 at pin 5 of the device 105, divides the output of the voltage controlled oscillator 107 and supplies the resulting signal to the input of the phase comparator 115 of the phase locked loop 105. The output of the voltage controlled oscillator 107 at pin 4 of the phase locked loop 105 is connected to one input of a NAND gate 109 and over 4.7K resistor to +5 volts DC. Gate 109 has another input connected through a resistor 111 to +5 volts DC. The output of the gate 109 is connected to the lead 43 extending to the terminal receiver 26 and to an input of the frequency divider circuit 113 at pin 1 thereof.

The divider circuit 113 includes a divider state 143 which divides the signal output of the gate 109 by sixteen and a divider stage 145 which divides the signal output of the divider stage 143 by four. The signal output of the divider stage 145 at pin 5 is connected over lead 147 to an input of the phase comparator 115 at pin 5 of the phase locked loop 105 to supply a signal at the bit rate frequency of the data being transmitted to the phase comparator 115.

The voltage controlled oscillator 107 which operates at a frequency that is 64 times the bit rate of the data being transmitted enables the phase locked clock 35 to operate at 64 times the bit rate and is phase locked to the modem clock of the local data set 16. The phase locked clock 35 operates at 64 times the bit rate of the local data set clock pulse rate so that the terminal receiver 26 can use these phase locked pulses to synchronize with the incoming data signals.

In the exemplary embodiment, the phase locked loop clock 35 operates at either 2400 bits per second or 4800 bits per second, as a function of the setting of a manual switch 126 which selects either one of the two rates by connecting frequency determining components to inputs of the voltage controlled oscillator at pins 8 and 9 of the phase locked loop. In the position as shown in the drawings, a capacitor 128 is connected through the switch 126 to the pin 9 of the phase locked loop 105 and a fixed resistor 130 and a variable resistor 132 are connected in series between +5 volts DC through the switch 126 to the pin 8 of the phase locked loop 105, a capacitor 134 being connected between pin 8 and pin 7 of the phase locked loop 105. In the position as shown in the drawings, the clock 35 operates for a 2400 bits per second mode of operation, and in the other position of the switch 126, the clock 35 operates at 4800 bits per second. In the latter position, a capacitor 136 is connected from ground through the switch 126 to the pin 9, and a fixed resistor 138 is connected in series with a variable resistor 141 connect +5 volts DC through the switch 126 to the pin 8.

Considering now the display panel unit 64 in greater detail with reference to FIG. 4 of the drawings, the error display unit 64 includes three JK flip-flops 151, 153 and 155 which have their K inputs connected to three of the leads respectively designated PARITY, OVER-RUN and BREAK from the status register 56 of the terminal receiver 26 of FIG. 2 so that when any one of these error conditions is generated by the status register 56, they are latched in the flip-flops of the error display unit 64. The Q outputs of the flip-flop 151, 153 and 155 are connected through respective inverter gates 157, 159 and 162 to a series of three light emitting diodes 164, 166, and 168, respectively, which in turn are connected through a series of three resistors 169, 170 and 172 to +5 volts DC. As a result, when the flip-flops 151, 153 or 155 become set, the respective light emitting diodes are energized to provide a visual error indication.

A lead 174 connects the lead 43 from the phase locked clock 35 to the clock inputs of the flip-flops 151, 153 and 155 to serve to clock them when the setting signals occur. The lead 73 from the master reset switch of FIG. 2 is connected to the DC reset inputs for the flip-flops 151, 153 and 155 to reset them. A switch 176 normally connects ground potential to the J inputs to the flip-flops, but when it is switched into its other position +5 volts DC is connected through a resistor 178 to the J inputs of the flip-flops for resetting them at the error display unit 64.

In connection with both the terminal receiver 26 and the terminal transmitter 54, all of the outputs have 6.8K ohms resistors connected to −12 volts DC, and all of their inputs unless otherwise shown or described are left open circuited.

Figure 5:
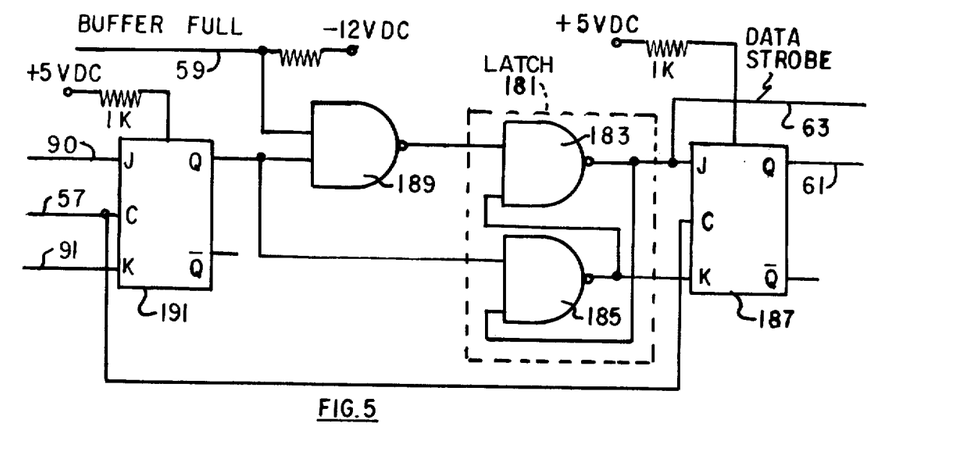
FIG. 5 is a schematic and symbolic block diagram of the control logic of FIG. 2.
Figure 6:
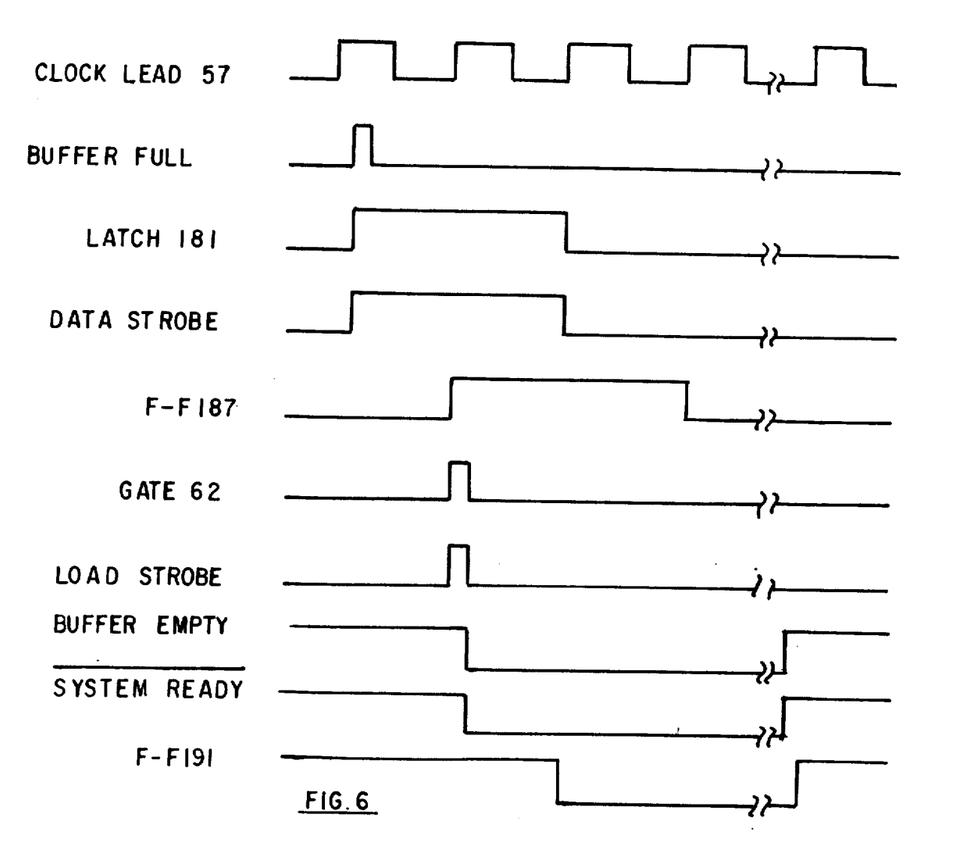
FIG. 6 is a signal diagram useful in understanding the operation of the control logic of FIG. 5.

Considering now the control logic 55 in greater detail with reference to FIGS. 5 and 6 of the drawings, the control logic 55 includes a pair of JK flip-flops 191 and 187, a latch circuit 181, comprising NAND gates 183 and 185, and a NAND gate 189. Flip-flop 191 is set in response to the first clock pulse received via the clock lead 57 from the phase locked clock 35 after the signal $\overline{\text{SYSTEM READY}}$, received via the lead 90, becomes true. The flip-flop 191 is reset by the next clock pulse after the signal $\overline{\text{SYSTEM READY}}$ goes false.

The signal DATA STROBE is supplied via the lead 63 to the pin 20 of the receiver unit 26 for enabling the data stored in the buffer storage 49 to be gated to the outputs of the buffer storage 49 for transfer to the buffer storage 52 of the terminal transmitter 54. Flip-flop 187, when set, causes the signal LOAD STROBE to be generated by the circuit 58 by supplying a signal from the Q output of the flip-flop 187 over lead 61 to an input of gate 60 (FIG. 2). NAND gate 189 is enabled to respond to the signal BUFFER FULL from the status register 56 via the lead 59 to set the latch circuit 181 to cause the generation of the signal DATA STROBE when the signal BUFFER FULL becomes true.

Considering now the operation of the control logic 55 with particular reference to FIG. 6, the clock pulses supplied on the lead 57 are represented in FIG. 6, it being understood that the shape of the clock pulses, as well as the frequency thereof, being well known to those skilled in the art. Also, if desired either trailing edge or leading edge triggering may be employed as is well known in the art. Thus, the signal on lead 57, as illustrated in FIG. 6, is shown for information purposes only to facilitate the understanding of the operation of the present invention, and it is to be understood that other waveforms and triggering may also be employed as is well known in the art.

Assuming that the buffer storage 52 for the terminal transmitter 54 is empty so that signals BUFFER EMPTY and $\overline{\text{SYSTEM READY}}$ are true, that flip-flop 191 is set, and that data has just been received in the shift register 28 via gate 31, such data is then transferred to the buffer storage 49. After the information is received in the buffer storage 49, the signal BUFFER FULL is generated and is supplied via the lead 59 from the status register 56 to the gate 189, to enable gate 189 causing the latch 181 to be set. The setting of the latch 181 causes the generation of the signal DATA STROBE which gates the data to inputs of the buffer storage 52. The access of data in the buffer storage register 49 by means of the signal DATA STROBE resets the buffer status output and signal BUFFER FULL goes false. It is pointed out that the duration of signal BUFFER FULL, while shown by way of illustration, to by approximately one-fourth the width of the clock pulses on line 57, actually represents the delay before an internal latch of the status register is reset by signal DATA STROBE, and the duration of signal BUFFER FULL would typically be on the order of 500 NS.

When the next positive transition of the clock pulse occurs on lead 57, the flip-flop 187 is set by the outputs of latch 181. The setting of the flip-flop 187 causes the gates 60 and 62 to generate the signal LOAD STROBE to enable the buffer storage 52 to receive the information from the buffer storage 49. In this regard, the signals DATA STROBE and LOAD STROBE cause the information to be transferred between the two buffer storage areas. It should be noted that due to the timing of the control logic 55, the data strobe signal is generated before the load strobe signal. It is advantageous to have such a delay, and thus control logic provides a controlled transfer of the data.

When the signal LOAD STROBE becomes true, the buffer empty latch is reset by the signal LOAD STROBE and the signal BUFFER EMPTY becomes false after a delay corresponding to the reset time for the buffer empty latch, so that the signal $\overline{\text{SYSTEM READY}}$ becomes false. In response thereto, the gate 60 is inhibited to terminate the signal LOAD STROBE. The data from the receiver 26 is gated into the transmitter buffer storage 52 at the trailing edge of the signal LOAD STROBE. While, for purposes of illustration, the duration of the signal LOAD STROBE is also shown to be approximately one fourth the width of the clock pulses, a typical value for the duration of such pulse is 750 NS. After the signal $\overline{\text{SYSTEM READY}}$ becomes false, the flip-flop 191 is reset upon the next positive transition of the clock signal on lead 57 causing the latch 181 to reset via an input to gate 185 thereof to terminate the signal DATA STROBE. Also, while flip-flop 191 is reset, the gate 189 is inhibited from responding to the signal BUFFER FULL to again set the latch 181. The flip-flop 187 is reset upon the next positive transition of the clock signal on the lead 57.

When the information is transferred from the buffer storage 52 to the shift register 77, for transmission to the data set 16, the signal BUFFER EMPTY is then generated to cause the signal $\overline{\text{SYSTEM READY}}$ on the lead 90 to become true to permit the flip-flop 191 to be set, thereby removing the inhibit from the gate 189. Thereafter, another data transfer operation may be effected. It should be noted that the signal LOAD STROBE terminates prior to the termination of the signal DATA STROBE to insure the proper sequencing of the operation of the data transfer operation.

The following is a list of components which may be used for the interface circuit 12 of the present invention.

TABLE I

| | |
|---|---|
| gate 31 | Motorola MC 1489L |
| gate 60 | National Semiconductor SN7400N |
| gate 62 | National Semiconductor SN7400N |
| resistor 71 | 1 K ohms |
| gate 86 | National Semiconductor SN7400N |
| resistor 88 | 1 K ohms |
| gate 89 | National Semiconductor SN7400N |
| gate 92 | Motorola MC1488L |
| capacitor 96 | 330 p farads |
| gate 109 | National Semiconductor SN7400N |
| resistor 111 | 1 K ohms |
| capacitor 119 | 0.1 p farads |
| resistor 120 | 10 K ohms |
| resistor 122 | 1 K ohms |
| resistor 124 | 1 K ohms |
| capacitor 128 | 0.001 microfarads |
| resistor 130 | 1 K ohms |
| variable resistor 132 | 0 to 20 K ohms |
| capacitor 134 | 0.001 microfarads |
| capacitor 135 | 0.1 microfarads |
| capacitor 136 | 330 p farads |

TABLE I-continued

| | |
|---|---|
| resistor 138 | 1 K ohms |
| variable resistor 141 | 0 to 20 K ohms |
| divider 143 | National Semiconductor SN7493N |
| divider 145 | National Semiconductor SN74107N |
| flip-flops 151, 153 and 155 | National Semiconductor SN74107N |
| gates 157, 159 and 162 | Motorola SN7438N |
| resistors 169, 170 and 172 | 100 ohms |
| resistor 178 | 1 K ohms |
| gate 183 | Motorola SN7400N |
| gate 185 | Motorola SN7400N |
| flip-flop 187 | National Semiconductor SN74107N |
| gate 189 | Motorola SN7400N |
| flip-flop 191 | National Semiconductor SN74107N |

While the invention has been particularly shown and described with reference to a preferred embodiment thereof, it will be understood by those skilled in the art that various changes in form and details may be made therein without departing from the true spirit and scope of the present invention.

What is claimed is:

1. In a data transmission computer system having a computer for generating data signals and a local data set having means for transmitting the data signals to a remotely located data set over a transmission line which interconnects said local data set and said remotely located data set, said local data set having means for providing recurring clock pulses at a clock output thereof, an arrangement for synchronizing the data signals with the clock pulses, comprising:

a receiving register coupled to an output of said computer for receiving and storing the data signals generated by the computer, said receiving register including status means for providing a status signal whenever said receiving register is storing a given number of said data signals;

synchronizing means for providing clock signals for application to a clock input of said receiving register to enable said receiving register to store the data signals, said synchronizing means having first means coupled to said clock output of said local data set, and being responsive to the clock pulses provided by said local data set to provide first and second timing pulses related in frequency to the frequency of said clock pulses, and second means having an input connected to an output of said first means to receive said first timing pulses, and a further input coupled to said output of said computer for receiving said data signals, said second means being responsive to said first timing pulses and to said data signals to provide said clock signals whereby the data signals are synchronized with the clock pulses as the data signals are stored in said receiving register;

a transmitting register coupled to the output of said receiving register for receiving the data signals from said receiving register and for storing the data signals;

means coupling the output of said transmitting register and a data input of said local data set;

control logic means having an input connected to an output of said status means to receive said status signal and further input connected to a further output of said first means to receive said second timing pulses, said control logic means being responsive to said status signal and said second timing pulses to provide transfer signals for effecting the transfer of the data signals from the receiving register to the transmitting register; and means for extending the clock pulses provided by said local data set to a clock input of said transmitting register to cause the data signals, which are transferred to said transmitting register under the control of said control logic means, to be transferred from said transmitting register to the local data set at a rate determined by the clock pulses provided by said local data set.

2. An arrangement according to claim 1, wherein said first means of said synchronizing means includes a phase locked loop responsive to said clock pulses for generating phase locked timing pulses at a frequency which is an integral multiple of the frequency of said clock pulses, said second means being responsive to said phase locked timing pulses and to said data signals for providing a clock signal for application to said receiving register at the midpoint in time of each data signal.

3. An arrangement according to claim 2, wherein said phase locked loop includes a voltage controlled oscillator and a reference establishing circuit for enabling said voltage controlled oscillator to generate the phase locked pulses at a rate equal to N times the rate of the clock pulses from the local data set.

4. An arrangement according to claim 3, wherein said N equals 64.

5. An arrangement according to claim 3, further including capacitance means for causing the voltage controlled oscillator to have a selected one of a plurality of different output frequencies.

6. An arrangement according to claim 5, wherein said capacitance means includes a pair of resistance-capacitance circuits and a switch for selecting one of them to couple the selected one to the oscillator.

7. An arrangement according to claim 1, wherein said receiving register includes an input shift register for receiving the data signals from the computer in serial asynchronous form, and a receiving buffer storage register having parallel inputs connected to parallel outputs of said input shift register whereby said data signals can be transferred from said input shift register to said receiving buffer storage register in a parallel mode of operation.

8. An arrangement according to claim 7, wherein said transmitting register includes a transmitting buffer storage register having parallel inputs connected to parallel outputs of said receiving buffer storage register for receiving said data signals from said receiving register and an output shift register having parallel inputs connected to parallel outputs of said transmitting buffer storage register whereby said data signals can be transferred from said transmitting buffer storage register to said output shift register in a parallel mode of operation, said data signals being shifted out of said output shift register under the control of said clock pulses for transfer to said local data set.

9. An arrangement according to claim 8 wherein said receiving register includes first transfer timing means responsive to said second means of said synchronizing means for effecting the transfer of the data signals between said input shift register to said receiving buffer storage register.

10. An arrangement according to claim 9, wherein said control logic means includes first transfer means having means responsive to said status signal for generating a data strobe signal for application to said receiving buffer storage register to cause the data signals in said receiving buffer storage register to be transferred to said parallel outputs of said buffer storage register.

11. An arrangement according to claim 10, wherein said control logic means includes second transfer means having means responsive to said data strobe signal and one of said second timing signals for generating a load strobe signal for enabling said transmitting buffer storage register to receive said data signals from said parallel outputs of said receiving buffer storage register, said load strobe signal being generated within a predetermined time following the initial generation of said data strobe signal.

12. An arrangement according to claim 11, wherein said transmitting buffer storage register provides a buffer empty signal whenever said transmitting buffer storage register is empty, said transmitting register including second transfer timing means operable when enabled to effect the transfer of the data signals between said transmitting buffer storage register and said output shift register, said control logic means further including transfer control means responsive to said buffer empty signal to enable said first transfer means to respond to said status signal, said transfer control means being operable to enable said second transfer timing means, and to disable said second transfer means for terminating said load strobe signal, and means responsive to said transfer control means and said second timing pulses to disable said first transfer means for terminating said data strobe signal within a given time following the termination of said load strobe signal.

13. An arrangement according to claim 1, wherein said control logic means includes first transfer means responsive to said status signal for generating a data strobe signal to prepare the data signals in said receiving register to be transferred to said transmitting register.

14. An arrangement according to claim 13, wherein said control logic means further includes second transfer means responsive to said first transfer means and said second timing pulses for generating a load strobe signal for enabling said transmitting register to receive said data signals from said receiving register, said load strobe signal being generated within a predetermined time following the initial generation of said data strobe signal.

15. An arrangement according to claim 14, wherein said control logic means further includes transfer control means enabled by said transmitting register in response to the transfer of data signals thereto, to disable said second transfer means for terminating said load strobe signal, and means responsive to said transfer control means and to said second timing pulses to disable said first transfer means for terminating said data strobe signal within a given time following the termination of said load strobe signal.

16. An interface circuit adapted for use in a data transmission system having a data processor for generating data signals in an asynchronous serial manner, and having a data set having means for providing clock pulses and means for sending the data signals over a transmission line to a remote location in a synchronous manner under the control of clock pulses provided by said data set, comprising:

receiving register means having a serial data input coupled to an output of said data processor means for receiving and storing the data signals from said processor, said receiving register means including status means for providing a status signal whenever said receiving register is storing a given number of said data signals;

synchronizing means having first means coupled to a clock output of said data set, and being responsive to the clock pulses provided by said data set to provide first and second timing pulses related in frequency to the frequency of said clock pulses, and second means having an input connected to an output of said first means to receive said first timing pulses, and a further input coupled to said output of said computer for receiving said data signals, said second means being responsive to the data signals and said first timing pulses for providing clock signals for application to a clock input of said receiving register means to enable it to receive said data signals in synchronism with the clock pulses;

buffer means having parallel data inputs connected to parallel data outputs of said receiving register means for temporarily receiving the synchronized data signals from said receiving register means;

control logic means including transfer means having an input connected to an output of said status means to receive said status signal and a further input connected to a further output of said first means to receive said second timing pulses, said transfer means being responsive to said status signal and said second timing pulses to provide transfer signals for application to said receiving register means and said transmitting register means for transferring the synchronized data signals to said buffer means; and transmitting register means having parallel data inputs connected to parallel data outputs of said buffer means for receiving said synchronized data signals from said buffer means, means coupling a serial data output of said transmitting register means to a data input of said data set, and means connected between a clock output of said data set and a clock input of said transmitting register for extending the clock pulses to said transmitting register means to cause the synchronized data signals to be transferred in serial form to said data set for transmission thereby over said transmission line to said remote location.

17. An interface circuit according to claim 16, wherein said transfer means includes first transfer means responsive to said status signal for generating a data strobe signal to prepare the data signals in said receiving register to be transferred to said transmitting register.

18. An interface circuit according to claim 17, wherein said transfer means further includes second transfer means responsive to said first transfer means and said second timing pulses for generating a load strobe signal for enabling said transmitting register to receive said data signals from said receiving register, said load strobe signal being generated within a predetermined time following the initial generation of said data strobe signal.

19. An interface circuit according to claim 18, wherein said control means further includes transfer control means enabled by said transmitting register in response to the transfer of data signals thereto, to disable said second transfer means for terminating said load strobe signal, and means responsive to said transfer control means and to said second timing pulses to disable said first transfer means for terminating said data strobe signal within a given time following the termination of said load strobe signal.

20. An interface circuit adapted for use in a data transmission system having a data processor for generating asynchronous data signals and having a data transceiving means connected to a transmission line for sending the data signals over said transmission line to a remote location in a synchronous manner under the control of clock pulses provided by the data transceiving means comprising:

a receiving register having an input shift register and a receiving buffer register, said input shift register having a serial input coupled to an output of said data processor means for receiving said data signals, and having parallel outputs connected to parallel inputs of said receiving buffer register, and status means for providing a status signal whenever said receiving buffer register is storing data signals;

a transmitting register including a transmitting buffer register and an output shift register, said transmitting buffer register having parallel inputs connected to parallel outputs of said receiving buffer register, and having parallel outputs connected to parallel inputs of said output shift register, said output shift register having a serial output coupled to said data transceiving means;

synchronizing means having first means coupled to said clock output of said data transceiving means, and being responsive to said clock pulses provided by said data transceiver means to provide first and second timing pulses related in frequency to the frequency of said clock pulses, and second means having an input connected to an output of said first means to receive said first timing pulses, and a further input coupled to said output of said data processor for receiving said data signals, said second means being responsive to said first timing pulses and to said data signals to provide said clock signals for application to a clock input of said input shift register to cause said data signals to be shifted into said input shift register whereby said data signals are synchronized with the clock pulses as the data signals are shifted into said input register;

control logic having an input connected to an output of said status means to receive said status signal and a further input connected to a further output of said first means to receive said second timing pulses, said control logic being responsive to said status signal and said second timing pulses to provide transfer signals to said buffer storage registers for effecting the transfer of the data signals from said input shift register to said output shift register over the associated buffer storage registers; and means for extending said clock pulses to a clock input of said transmitting register to cause said data signals to be serially shifted out of said output shift register for transfer to said data transceiving means for transmission thereby over said transmission line to said remote location.

* * * * *